Jan. 8, 1924.
Ö. GÁL
MOTOR PLOW
Filed Oct. 29, 1921
1,480,386
2 Sheets-Sheet 2
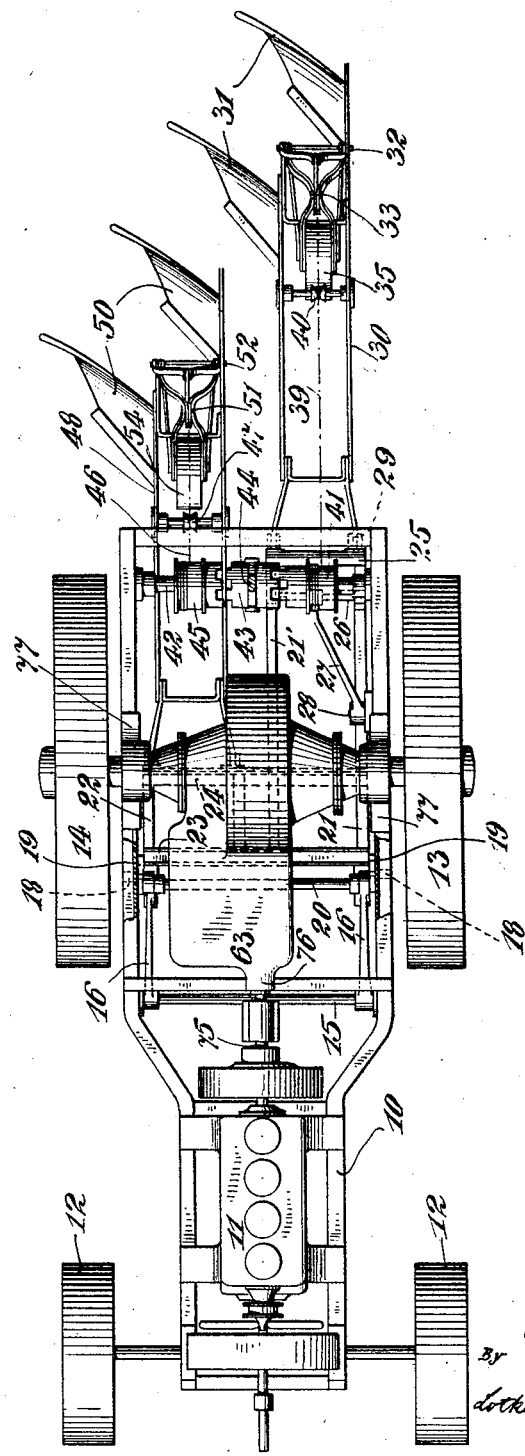
Inventor
Ödön Gál
By
Lotka, Kehlenbeck & Mathe
Attorneys Patented Jan. 8, 1924.

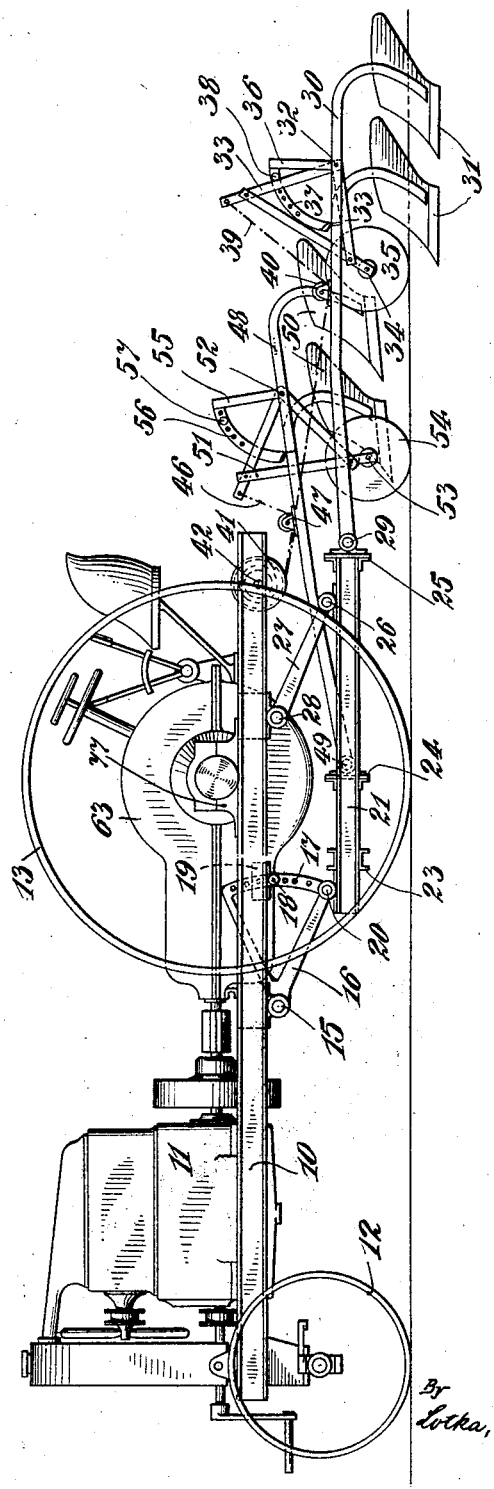

1,480,386

UNITED STATES PATENT OFFICE.

ÖDÖN GÁL, OF BUDAPEST, HUNGARY.

MOTOR PLOW.

Application filed October 29, 1921. Serial No. 511,486.

*To all whom it may concern:*

Be it known that I, ÖDÖN GÁL, a citizen of Hungary, and resident of Budapest, Hungary, have invented certain new and useful Improvments in Motor Plows, of which the following is a specification.

My invention relates to motor plows and has for its object to provide a relatively simple construction of this character, which will be operated readily by unskilled farm laborers. The invention includes a novel transmission which dispenses with the complications of the differential mechanism usually employed in connection with the drive wheels. Other features of the invention relate to devices for supporting and adjusting the plow-shares, all of which will be described more fully hereinafter, the novel features of my invention being defined in the appended claims.

Without desiring to restrict myself to the various details shown, I will now describe a preferred and satisfactory embodiment of my invention illustrated by the accompanying drawings, in which Fig. 1 is a side elevation of such improved motor plow; and Fig. 2 is a plan view thereof, with parts in section.

At 10 I have indicated the main frame or chassis of the machine, with a suitable motor 11 (generally of the internal-combustion type) mounted thereon. The said frame is supported on front wheels 12, provided with any usual or approved steering mechanism (not shown), and on rear wheels 13, 14, which may have cleats of well known character (not shown) and which are driven from said motor in any suitable manner. At the central portion of the frame 10 are pivoted, to swing about a transverse horizontal axis 15, two arcs or sectors 16, located adjacent to the side members of said frame, and provided with a series of openings or sockets 17 adapted to receive a bolt or locking pin 18 (one for each sector) which also passes through a corresponding opening or socket in a block or bracket 19 secured to the adjacent portion of said side member. Of course, the sockets 17 are all at the same distance from the axis 15. Each of the links or sectors 16 has at its lower end a pivotal connection 20, parallel to the axis 15, with the front portion of an auxiliary frame which comprises a long side member 21 at one side of the machine, a short side member 22 at the other side of the machine, a transverse member 23 connecting the members 21, 22 adjacent to the pivot connection 20, a similar member 24 connecting the rear end of the member 22 with the central portion of the member 21, a short transverse member 25 extending from the rear end of the side member 21 to a point near the longitudinal center of the machine, and a longitudinal member 21'. extending from the inner end of said member 25 forwardly to the transverse member 23. This auxiliary frame is therefore somewhat L-shaped in plan view, see Fig. 2. The rear portion of the auxiliary frame is connected pivotally at 26 with the lower end of a link 27, fulcrumed on the main frame at 28, and engaging the pivot connection 26 about midway between the parallel members 21, 21'. The distance between the axes 15 and 20 is equal to the distance between the axes 28 and 26, and since all these four axes are parallel, it follows that when the auxiliary frame is adjusted up or down by swinging the links 16 (and then locking them by inserting the bolts 18 through the proper holes 17), said auxiliary frame will have a parallel motion, remaining parallel to its original position, that is to say, horizontal, in the particular embodiment illustrated.

To the rear end of the auxiliary frame, at one side of the machine, adjacent to the short cross member 25, is pivoted to said auxiliary frame, about a horizontal axis 29 extending transversely of the machine, a swinging frame 30 carrying suitable plowshares 31. To this plow-share frame 30 is pivoted, to swing about a transverse horizontal axis 32, a triangular carrier 33 in which is journaled at 34 a small wheel or roller 35 arranged to rotate about a horizontal transverse axis. Adjacent to this carrier 33, a bracket 36 is secured rigidly to the swinging frame 30, said bracket having a series of openings or sockets 37, preferably at equal distances from the axis 32, and parallel thereto. A bolt or pin 38, which may be inserted in any one of the sockets 37, is adapted to be engaged by one of the sides of the carrier 33, as indicated in Fig. 1, thus forming a stop which limits the downward movement of the frame 30 relatively to the wheel 35, and therefore the depth to which the shares 31 will enter the soil, according to the adjustment of the bolt 38. In order to raise the frame 30 with the shares 31 when desired, the following arrangement has been illustrated: The carrier 33 is connected with a wire or other flexible member 39 guided by a pulley 40 carried by the swinging frame 30, the other end of said wire being wound on a drum 41 mounted loosely on a shaft 42 having a suitable operative connection (not shown) with the engine 11. On said shaft is further mounted to rotate in unison therewith, but capable of sliding lengthwise, a clutch member 43 operated by a shifting lever indicated at 44, or by any other suitable means. This clutch member 43 has clutch teeth at both ends, to engage either clutch teeth on the drum 41, or clutch teeth on a similar drum 45, likewise mounted loosely on the shaft 42. On this drum winds one end of a wire or other flexible connection 46, guided by a pulley 47 which is journaled on a swinging frame 48, similar to the frame 30 and pivoted to the auxiliary frame adjacent to the transverse member 24, about a transverse axis indicated at 49. The frame 48 carries plow-shares 50, and also a triangular carrier 51, pivoted at 52, the rear end of the connection 46 being secured to this carrier, on which is journaled a wheel or roller 54, corresponding to the roller 35. The frame 48 further carries a bracket 55, provided with a series of openings or sockets 56, adapted to receive a bolt 57, similar to the bolt or pin 38. It will be understood that by this mechanism the two swinging frames 30, 48 with the plow-shares thereon may be adjusted up or down relatively to the soil, during or after plowing, thus regulating the depth of the furrow, and the shares 31, 50 may even be lifted clear off the ground, as indicated for the shares 50 in Fig. 1.

The mechanism for driving the main wheels 13, 14 may be constructed in any approved manner, the drawings merely indicating a gear box or housing 63 supported on the frame 10 at three points, viz.: in front at 76, and at the two sides at 77, with a drive shaft 75 extending into said housing. It is to be understood that the hub of each wheel is connected with the rim by spokes, a web, or some other structure; for the sake of clearness, such connecting structure has been omitted from Fig. 1.

It will be obvious that instead of the plow-shares 31, 50, other soil-working devices might be secured to the swinging frames 30 and 48, and the machine may also be used simply as a tractor, by bringing both frames 30 and 48 to the raised or inactive position illustrated by Fig. 1 with reference to the frame 48.

The details of the motor or engine 11, the clutch by which said engine drives the shaft 75, the arrangements for obtaining different speeds forward and for reversing the motion of the vehicle, and for steering the latter, may be of any well-known or approved type, and are not represented in detail in the drawings.

I claim as my invention:

1. In a soil-working machine, a wheeled frame, an auxiliary frame adjustable up and down relatively to the first-named frame means for adjusting said auxiliary frame, a swinging frame carried adjustably by said auxiliary frame and provided with soil-working devices, and mechanism for adjusting said swinging frame independently of said auxiliary frame.

2. In a soil-working machine, a wheeled frame, an auxiliary frame, parallel links connecting said frames and enabling the auxiliary frame to be adjusted up or down in parallel relation to its original position, means for holding said auxiliary frame in its adjusted position, a swinging frame carried adjustably by said auxiliary frame, and soil-working devices attached to said swinging frame.

3. In a soil-working machine, a wheeled frame, front and rear links pivoted to said frame about transverse horizontal axes, an auxiliary frame pivotally connected with the other ends of said links, and adjustable thereby in parallel relation to its original position, and another frame, carrying soil-working devices and pivoted to said auxiliary frame about a transverse horizontal axis.

4. In a soil-working machine, a wheeled frame, two frames mounted upon said wheeled frame and carrying soil-working devices and adjustable independently with reference to the first-named frame, an operating shaft, drums mounted on said shaft loosely and each connected with one of said adjustable frames for adjusting the same, and clutch means common to both of said drums for connecting said shaft operatively with one or the other of said drums.

In testimony whereof I have signed this specification.

ÖDÖN GÁL.